United States Patent [19]
Whitehead et al.

[11] 4,409,617
[45] Oct. 11, 1983

[54] INFORMATION PROCESSING

[75] Inventors: Norman P. Whitehead, Newbury; Kenneth D. Boness, Wallingford; Roger Martin, Faringdon, all of England

[73] Assignee: United Kingdom Atomic Energy Authority, London, England

[21] Appl. No.: 326,164

[22] Filed: Nov. 30, 1981

[30] Foreign Application Priority Data

Dec. 3, 1980 [GB] United Kingdom ............... 8038807

[51] Int. Cl.³ .............................................. H04N 7/08
[52] U.S. Cl. ..................................... 358/147; 358/140
[58] Field of Search ......................... 358/147, 140, 142

[56] References Cited
U.S. PATENT DOCUMENTS 4,281,345  7/1981  Wärn ................................. 358/147

Primary Examiner—Richard Murray
Attorney, Agent, or Firm—Larson and Taylor

[57] ABSTRACT

An information processor for rendering input data compatible with standard video recording and/or display equipment, comprising means for digitizing the input data over periods which are synchronous with the fields of a standard video signal, a store adapted to store the digitized data and release stored digitized data in correspondence with the line scan of a standard video monitor, the store having two halves which correspond to the interlaced fields of a standard video signal and being so arranged that one half is filled while the other is emptied, and means for converting the released stored digitized data into video luminance signals.

The input data signals may be in digital or analogue form.

A second stage which reconstitutes the recorded data also is described.

13 Claims, 4 Drawing Figures

INFORMATION PROCESSING

The present invention relates to the processing of information, and in particular to the processing of information signals produced during the testing of an object by means of ultrasonic vibration, so as to facilitate the storage and for display of those signals.

There are growing demands in connection with automatic non-destructive testing techniques for the ability to record raw signal data and waveforms. Unfortunately, the nature of the signals and waveforms utilised in such techniques are such that hitherto one has had to use either instrumentation-type tape recorders in conjunction with oscilloscopes to record and present the signals and waveforms, or extensively modify existing video recording equipment, with its attendant expense and compromise on performance.

The present invention on the other hand processes the signals and waveforms so that they are compatible with standard video equipment.

According to the present invention there is provided an information processor for rendering input data compatible with standard video recording and/or display equipment, comprising means for digitising the input data over periods which are synchronous with the fields of a standard video signal, a store adapted to store the digitised data and release stored digitised data in correspondence with the line scan of a standard video monitor, the store having two halves which correspond to the interlaced fields of a standard video signal and being so arranged that one half is filled while the other is emptied, and means for converting the released stored digitised data into video luminance signals.

The input data signals may be in digital or analogue form.

Preferably the information processor is incorporated in a system which has facilities for reconstituting the video luminance signals to reproduce the original input data and displaying the reconstituted signals.

The invention will now be described and explained, by way of example, with reference to the accompanying drawings, in which, FIG. 1a is a representation of a single line of a standard video line signal;

Figure 1A:
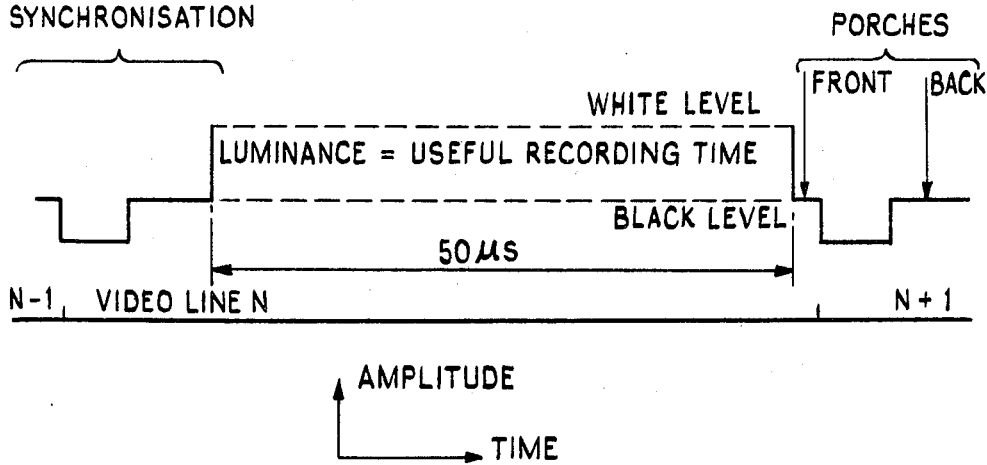
FIG. 1b is a representation of the two fields of video waveform.
Figure 1B:
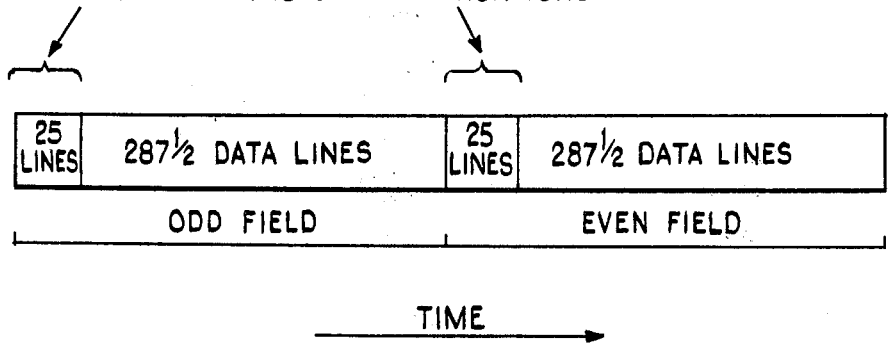

Referring to FIGS. 1a and 1b, a single line of a video screen is formed by variations in the intensity of the light produced by the screen of a cathode ray tube in response to modulations of the electron beam of the cathode ray tube by so-called luminance signals. The embodiment of the invention to be described utilises the well-known 625 line CC1R or PAL(I) standard. The luminance waveform is continuous only in short lengths each of which is equivalent to one line of a conventional T.V. picture. Each length of luminance waveform is separated by video synchronisation waveforms, including the front and back porches, which do not allow luminance data to be present. The 625 lines which make up a full screen are divided into two groups. These two groups form 'odd' and 'even' fields of $287\frac{1}{2}$ lines each and normally pictures are built up from an alteration of 'odd' and 'even' fields. In each field analoge waveforms are recorded on up to 256 lines, and digital data on up to 32 lines. For the successful operation of the invention, it is necessary for the incoming signals to be synchronised with the sequence of fields. This is achieved by means of a field switch signal which is generated from a master clock which runs at 5.25 $MH_z$ and produces a stable signal which is used for all synchronisation of the system. 336 cycles or pulses, of the clock signal represent one full video line. These pulses also form data time slots. 625 times 336 pulses produce all the video lines of a pair of fields. Integral numbers of clock pulses can be used to construct the incidence and duration of all video synchronisation waveforms.

The data storage capacity of the system may be determined as follows: In each video line, 256 of the 336 data time slots are used. Hence the digital storage capacity of the system is $N \times 256 \times 32$ bits per field (20 mS), where N is the number of bits per time slot. This usually is set to 1. Therefore the system can deal with 8192 bits per field.

Each time slot has a duration of $1/f$ where f is the clock frequency $= 1/5.25 \times 10^6 = 190.5$ nS. Hence there is available an analogue signal recording time of 256 $1/5.25 \times 10^{-6}$ seconds $= 48.76$ $\mu$s per line. Therefore the total analogue waveform recording capacity is 256 (lines) $\times 48.76$ $\mu$s per field.

Figure 2:
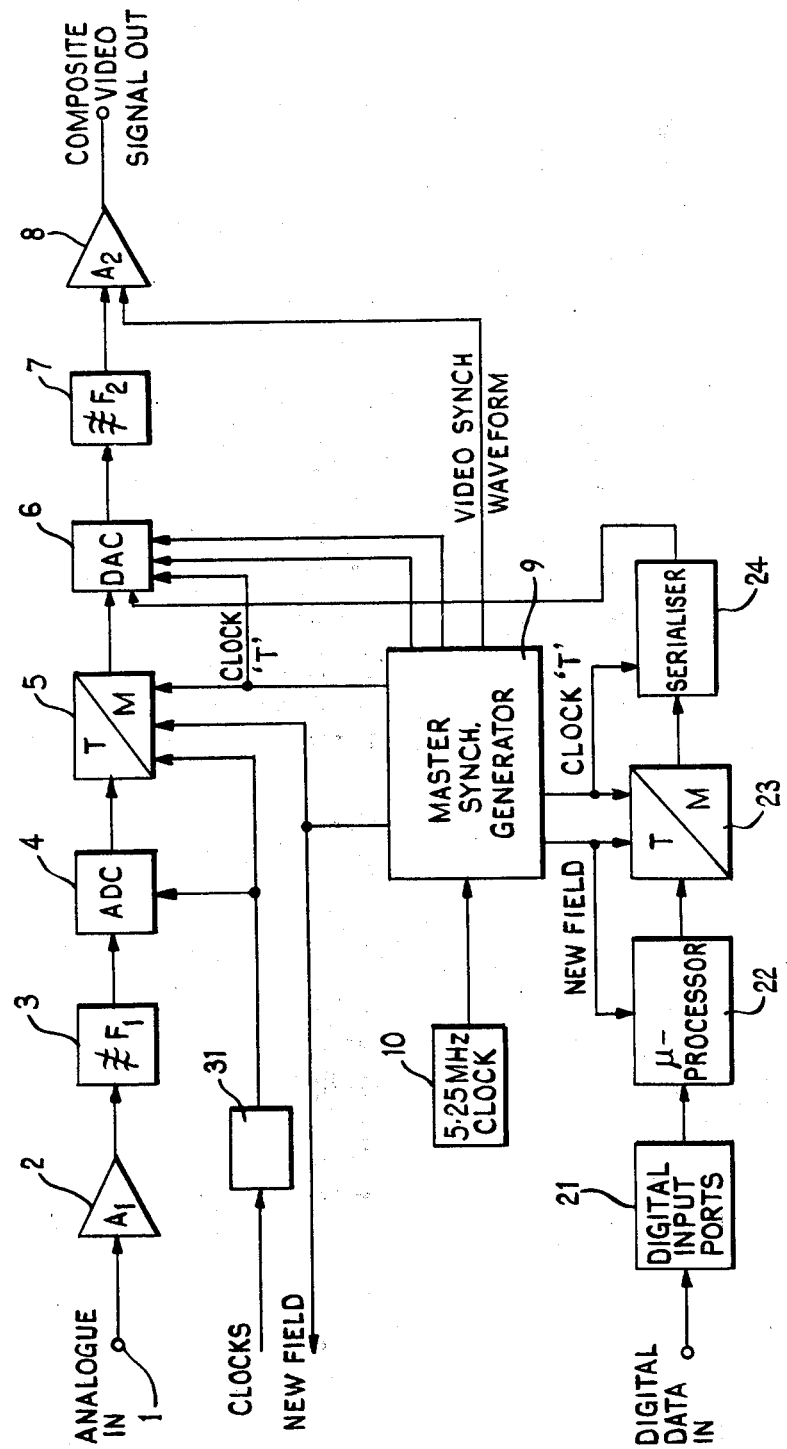
FIG. 2 is a block circuit diagram of an embodiment of the invention.

An embodiment of the system is shown in FIG. 2. The information processor for enabling non standard video input signals to be interfaced with standard video equipment shown has two input channels, one for analogue data such as waveforms and the other for digital data, shown generally by the reference $C_1$ and $C_2$. Each channel will be described separately.

The analogue channel $C_1$, comprises an input terminal 1, a buffering amplifier 2, a low pass filter 3, an analogue-to-digital converter 4, a transient memory 5, a digital-to-analogue converter 6, a second filter 7 and an output amplifier 8. It is to be noted that the digital-to-analogue converter 6, the filter 7 and the amplifier 8 also form part of the digital channel $C_2$. Connected to the transient memory 5, the digital-to-analogue converter 6 and the amplifier 8 is a master synchronisation signal generator 9. The signal generator 9 is under the control of the 5.25 $MH_z$ clock signal generator previously referred to.

The digital input signal channel $C_2$ consists of an input device 21, which may either be a plurality of parallel input ports, or an anlogue-to-digital converter if desired, a microprocessor 22, a digital transient memory 23, a serialiser 24 and the digital-to-analogue converter 6, filter 7 and amplifier 8 which form part of the channel $C_1$. The microprocessor 22, memory 23 and serialiser 24 also are under the control of the synchronisation signal generator 9. The signals from the synchronisation signal generator 9 which are applied to the digital transient memory 23 and the serialiser 24 cause digital data to pass in serial form N bits at a time from the memory 23 to the digital-to-analogue converter 6 at a clock rate 'T' (5.25 $MH_z$). This is done during the 32 lines in each field which are devoted to digital data. These lines are separate from the 256 analogue information lines. The digital data forms part of the luminance waveform on the composite video output.

Information signals entering to the channel $C_1$ are buffered and amplified by the amplifier 2 before passing to the filter 3 which is arranged to prevent sample data aliasing problems arising during the process of analogue-to-digital conversion in the converter 4. The converted analogue waveform signals are then stored in the transient memory 5, which is synchronised with the alternation of the video fields by means of the synchronisation signal generator 9. The waveform stored in the transient memory 5 is defined by signals from a sample clock 31, which is under the control of the user of the information signal processor. The maximum number of samples per field allowed is $2^{16}$ per field. Each sample is digitised to a degree of 8, that is, 1 part in 256. The signals from the clock 31 also are applied to the analogue-to-digital converter 4.

The transient memory 5 has two halves, each of size 64k bytes. The halves of the transient memory 5 alternate their functions. In one video field period, one half of the memory 5 will receive data at the rate of the clock 31 while the other half of the memory 5 is used by the system in sending stored information to the output end of the information processor. In the next video field period, the roles are reversed, and the data which were collected in the first field are released from the memory 5, at the clock rate T (5.25 MH$_z$) under the control of the synchronisation signal generator 9 during each of the 256 video lines which are used for analogue data. The released data are reconstructed in the digital-to-analogue converter 6 and filter 7 as analogue waveforms. The clock rate T is chosen so as to make the best use of the video luminance channel band width. The output from the filter 7 is the "luminance" waveform and is combined with a video synchronisation waveform derived from the master synchronisation signal generator 9 in the amplifier 8 to produce a composite video waveform.

Additional data is put into the luminance waveform to assure the quality of the data which is recorded via the information processor. The additional information is particularly important when data is replayed from a video recorder. All this information is incorporated in time slots 54–79, inclusive and follow the video signal back porch. The additional information consists of a reference black level, in slots 54–71 and a reference white level signal some 0.7 v above the black level in time slots 72 to 75 inclusive. This signal, which is useful for signal standardisation when replaying a recording, is followed by another reference level signal in time slots 76 and 77 which alternates between a black and a white signal level. By this means it is possible to identify a sequence of odd and even lines in replay, and so detect whether the automatic drop-out facility which is incorporated in some video recorders, and operates when a single line is lost in replay, has operated. Also, the first analogue sample on a line is held on the output for the time slots 78–79 before the first of the 256 true data slots appear. This is to avoid limited bandwidth slew-rate problems in the luminance channel of the video recorder display to which the information processer is connected.

In addition to producing all the system synchronisation and control signals outlined above, the synchronisation signal generator 9 causes the luminance waveform to be at the black level at all other times; particularly during video synchronisation periods.

If the information processor is used for the storage of data derived from the array of ultrasonic transducers, as part of an acoustic non-destructive testing system, then the digital information can represent the coordinates of the transducers as they are fired, thus enabling information as to the type of scan used to be stored.

Figure 3:
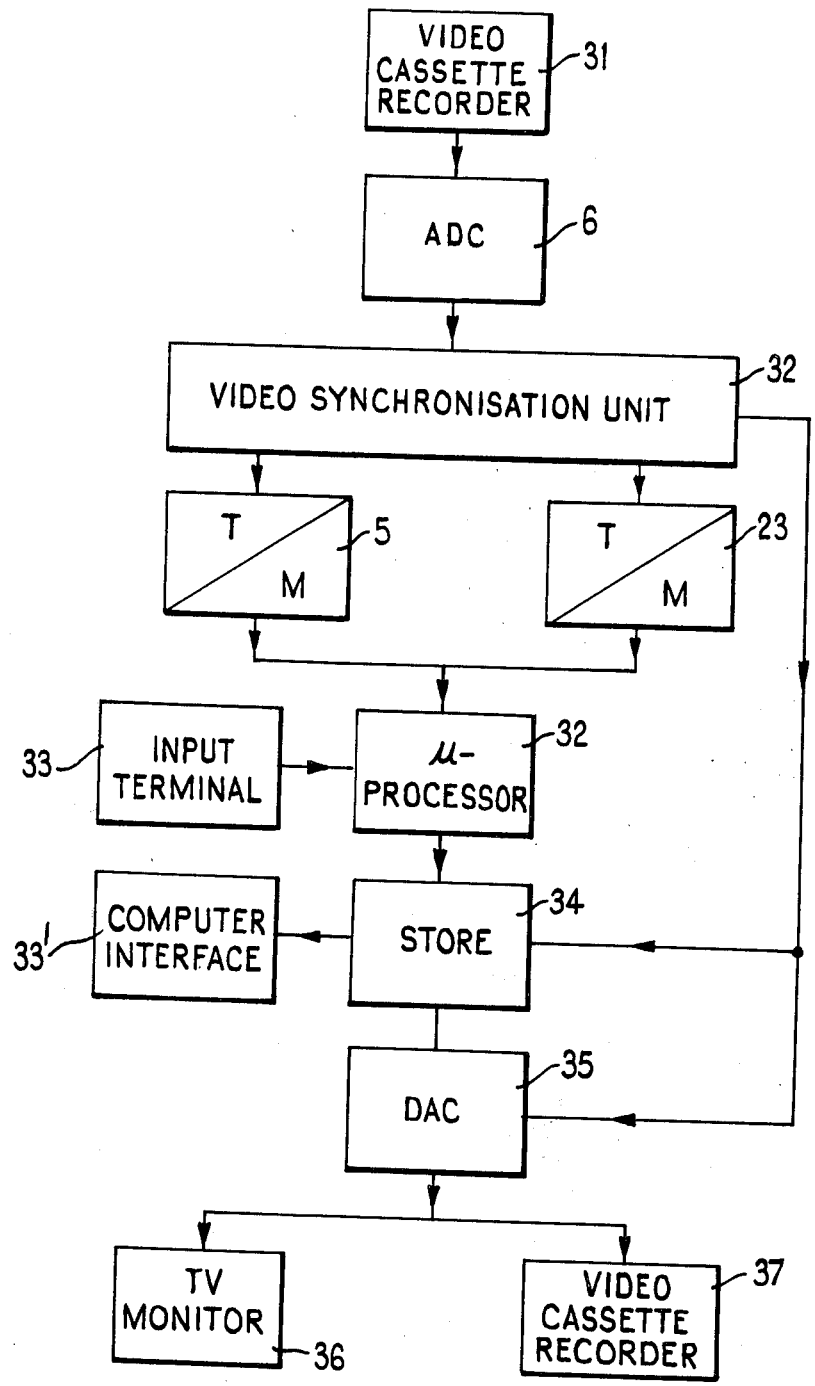
FIG. 3 is a block circuit diagram of further apparatus including the embodiment of FIG. 2.

The information processor may be incorporated into a complete system which can reconstitute the original input data. In such a case, much of the information processor can be used in reverse. FIG. 3 shows such an arrangement. Those components which serve a dual purpose are given the same reference numerals as were used when describing the embodiment of FIG. 2. Referring to FIG. 3, analogue signals from a video recorder 31 (which was not shown in FIG. 2) are converted back into digital signals by the digital-to-analogue converter 6, which now operates in an analogue to digital mode. A video synchronisation signal generator 32 (which comprises the clock unit 10, master synchronisation signal generator 9 and serialiser 24); causes that part of the digitised signals which represents the original analogue data applied to the information processor to be loaded into one half of the transient memory 5, and that part of the digital signals which represents the original digital date (transducer coordinates etc.) to be loaded into one half of the transient memory 23. As before, data loaded previously into the other halves of the transient memories 5 and 23 are released simultaneously from the other halves of the transient memories 5 and 23. The released data are applied to a microprocessor 32 which is arranged to operate upon the data received from the transient memories 5 and 23 to produce output data signals which have a desired format. For example, if the information processor is used as a part of an ultrasonic inspection system, any of the conventional forms of scan can be reproduced. In fact, any form of plot for which there is a suitable algorithum can be produced. As these operations are carried out in software, an input terminal 33 is provided by means of which it is possible to change the program controlling the microprocessor 32 so as to change the format of the output video signal, or otherwise to update the program embodied in the microprocessor 32. The output signals from the microprocessor 32 are applied in the form of a 256×256 element video picture matrix to a memory 34 to which a computer interface terminal 33' also is connected so that the picture matrix can be read into a larger computer for further detailed processing if required. The picture matrix data in the memory store 34 is then read out via the video synchronisation unit 32 and a digital-to-analogue converter 35 as a true video signal which is displayed directly on a video monitor 36. A second video recorder 37 enables the display on the monitor 36 to be recorded and played back later, if desired. This facility enables later data to be compared with earlier recorded data, so as to enable changes in the state of a system under observation to be detected.

In both the recording and playback parts of the system, extensive use is made of programmable electronic components. This provides flexibility in the use of the equipment. Many modifications to its operation can be carried out by software changes only. For example, although the system described can work with ultrasonic transducers which produce signals with a bandwidth of 3 MH$_z$, which is comparable with that of a video cassette recorder, the software can be modified to enable the system to deal with signals having a bandwidth of 30 MH$_z$, without the loss of data.

We claim:

1. An information processor for rendering input data compatible with standard video recording and/or display equipment, said information processor comprising means for digitizing the input data over periods which are synchronous with the fields of a standard video signal, memory means for storing the digitized data and for releasing stored digitized data in correspondence with the line scan of a standard video monitor, said memory means having two halves which correspond to the interlaced fields of a standard video signal and being so arranged that one half is filled while the other is emptied, and means for converting the released stored digitized data into video luminance signals.

2. An information processor according to claim 1, wherein the means for digitizing the input data over periods which are synchronous with the fields of a standard video signal comprises an analogue-to-digital converter and a sample rate clock for controlling the analogue-to-digital converter to provide a predetermined number of data samples per video field period.

3. An information processor according to claim 2, wherein the sample clock rate is such as to provide $2^{16}$ samples per video field period and the analogue-to-digital converter is arranged to digitize each sample to a degree of 8.

4. An information processor according to claim 1, claim 2 or claim 3, wherein each half of the memory means is arranged to receive the digitized data at the rate of the sample clock and then to release the stored information at a second clock rate under the control of a synchronization signal generator during each of those lines of a single video field which are to be used for the recording and reproduction of the input data.

5. An information processor according to claim 1, wherein the digitized data released from the store are reconstructed in a digital-to-analogue converter to produce an analogue signal waveform which provides a luminance signal, and there is provided means for combining the luminance signal with a video synchronization signal derived from the synchronization signal generator to provide a composite video signal.

6. An information processor according to claim 1, wherein there is provided a second data processing channel adapted to process separately digital input data.

7. An information processor according to claim 6, wherein the digital data processing channel comprises an input device, a microprocessor, a digital memory having two halves which correspond to the interlaced fields of a standard video signal, and being so arranged that one half is filled while the other is emptied, a serializer for causing digital data released from the digital store to pass in serial form a predetermined number of bits at a time at the same clock rate as information is released from the store for the digitised input data, a digital-to-analogue converter, a filter and an amplifier.

8. An information processor according to claim 7, wherein the microprocessor, store and serializer are under the control of a synchronization signal generator, and the digital data is passed by the serializer to the digital-to-analogue converter during a predetermined number of lines in each video field which are reserved for digital input data only.

9. An information processor according to claim 7, wherein the synchronization signal generator, digital-to-analogue converter, filter and amplifier are common to both the analogue and digital channels of the information processor.

10. An information processor according to claim 1 wherein there is provided means for reconstituting the original input data from the output video composite waveform when replayed from a video recording machine.

11. An information processor according to claim 10, wherein the means for reconstituting the original input data comprises an analogue-to-digital converter to which signals replayed from a video recorder can be applied, first and second transient memories each being divided into two halves, a video synchronization signal generator adapted to cause that part of the digitized signal which corresponds to original analogue input data to be loaded into one half of one transient memory and that part of the digitized signal which corresponds to original input data to be loaded into one half of the other transient memory and simultaneously to cause data stored in the other halves of the memories to be released to a microprocessor which is adapted to operate upon the data received from the transient memories to produce data signals which have a desired format, a further memory adapted to receive the data signals, a digital-to-analogue converter arranged to receive data signals released from the further memory under the control of the video synchronization signal generator and produce a video output signal for display on a television monitor.

12. An information processor according to claim 11, wherein the output data signals from the microprocessor are in the form of a picture matrix.

13. An information processor according to claim 11 or claim 12, wherein the microprocessor is adapted to produce data signals which correspond to any one of the conventional forms of scan which are used in nondestructive testing by means of ultrasound.

* * * * *